C. ROBINSON & J. W. COUNSELMAN.
LOCK FERRULE.
APPLICATION FILED MAR. 21, 1911.

1,005,313.

Patented Oct. 10, 1911.

WITNESSES:
E. M. Engstrom.
W. R. Clark

Clark Robinson   INVENTORS
Jasper W. Counselman
BY
L. L. Westfall their ATTORNEY

COLUMBIA PLANOGRAPH CO., WASHINGTON, D. C.

UNITED STATES PATENT OFFICE.

CLARK ROBINSON AND JASPER W. COUNSELMAN, OF SPOKANE, WASHINGTON.

LOCK-FERRULE.

1,005,313.　　　　　Specification of Letters Patent.　　Patented Oct. 10, 1911.

Application filed March 21, 1911.　Serial No. 616,028.

*To all whom it may concern:*

Be it known that we, CLARK ROBINSON and JASPER W. COUNSELMAN, citizens of the United States of America, residing at Spokane, in the county of Spokane and State of Washington, have invented certain new and useful Improvements in Lock-Ferrules, of which the following is a specification.

This invention pertains to ferrules and has for its object to provide a new and improved device for locking a trace to the end of a whiffletree and a neck-yoke to the end of the pole of a vehicle and the like.

The device consists practically in a metal portion hollowed out for the reception of the end of a whiffletree, pole or the like, a solid hub of less diameter than the hollowed out portion, cast integral therewith, and provided with a threaded end, the hub portion fitted loosely with an oblong block, oval in cross-section and the threaded end with an oblong nut.

Other details of construction will be hereinafter described and disclosed by the accompanying drawings, in which—

Figures 1, 2:
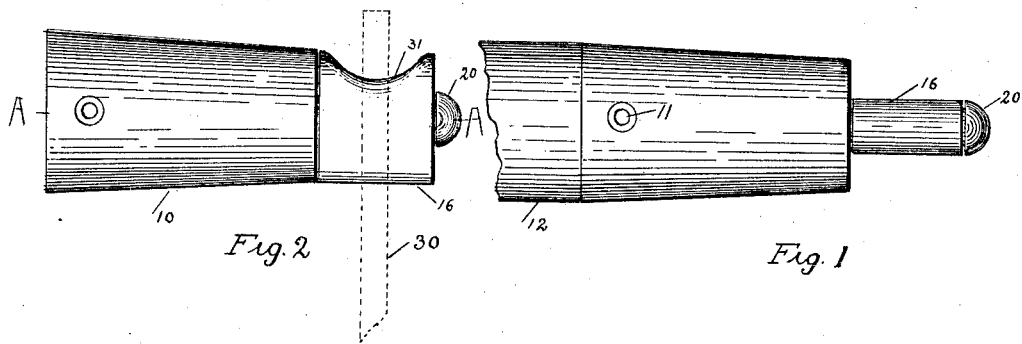
Figures 3, 4, 5, 6:
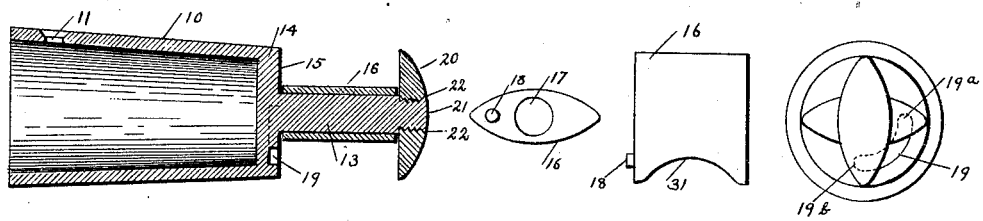
Figure 7:
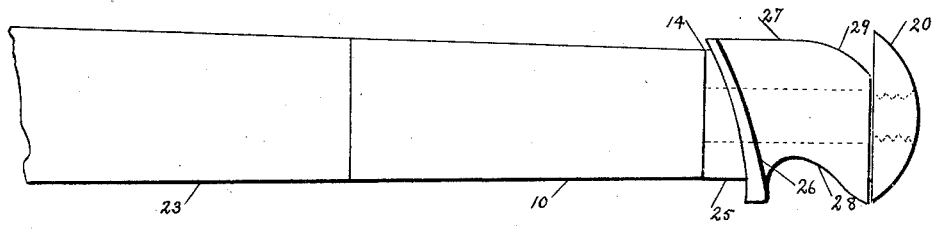
Figure 8:
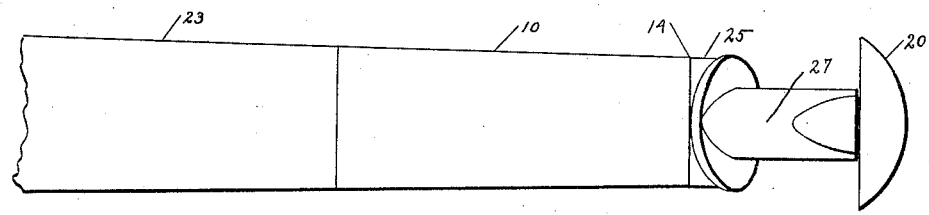

Figure 1 is a plan view of the end of a whiffletree with the improved device attached and in a position to be engaged by a trace, Fig. 2, is a plan view of the ferrule detached in the position it occupies when in use, Fig. 3, is a section of the same taken on the line A—A of Fig. 2, Fig. 4, is an end elevation of the oblong block mentioned as being oval in cross-section, Fig. 5, is a side elevation thereof, Fig. 6 is an end elevation of the complete device with the detail parts in the position they occupy when the device is in use, Fig. 7 is a plan view of the end of the pole of a vehicle with the device attached with the detail parts in position to be engaged by the connecting portion of a neck yoke and, Fig. 8 is a plan view of the same with the detail parts in the position they occupy when connected to a neck yoke.

The hollowed out portion 10 is provided with an opening 11 whereby the same may be made secure to the end of a whiffletree 12. The hub portion 13 is of less diameter than the hollowed out portion 10 and is connected therewith by a solid portion 14 having a side 15 at right angles with the hub portion 13. The block 16 has a longitudinal opening 17 through the same, adapted to fit the hub 13. The block 16 also has a lug 18 at one end thereof, which, when the block is engaging the shaft 13, will engage the curved slot 19, extending one-fourth way around the circle in the side portion 15. After the block 16 has been placed on the shaft 13, an oblong oval-shaped nut 20 is turned onto the threaded end 21 and bushed or riveted as at 22 in order to more thoroughly secure the nut 20 in its position. In order to apply the ferrule most desirably to the end of a vehicle pole 23, to serve as a connecting means with a neck yoke, it is desirable that the block portion for the hub 13 be of somewhat different external construction. For instance an inner end portion 25 of approximately the same diameter as the end 14 of the ferrule 10 with a curved flange 26 at approximately right angles with the oval-shaped portion 27, an inner curved under surface 28 on the under side of the portion 27 and a rounded outer-upper corner 29. In using the ferrule for the end of a whiffletree as a connecting means for a trace, the nut portion 20 is turned onto the threaded end 21, and left with its longest diameter vertical and the block portion 16 is turned with its curved outer surface to correspond with the outer surface of the nut 20 as shown in Fig. 1, the trace is then slipped over the nut portion 20 and onto the block portion 16, the horizontal draft on the trace 30 will bring the block portion 16 with its curved sides horizontal as shown in Fig. 2, the lug 18 on the inner end of the block 16 will pass from the end 19ª to the end 19ᵇ of the slot 19, and the relative parts are secure in that position, until the trace is released. An inner curved under surface 31 is provided in the block 16 to provide a bearing for the trace 30. It will thus be seen that the trace 30 is securely locked on the block 16 until released.

In the application of the ferrule for use on a vehicle pole as shown by Figs. 7 and 8 the nut portion 20 is set with its longest diameter horizontal so that when the connecting portion of a neck yoke is slipped onto the block portion with a vertical draft applied instead of a horizontal draft as is the case when a trace is attached to the same portion as the end of a whiffletree, the locking effect will be just as well accomplished.

We are aware of Patent No. 205,359, dated June 25, 1878 issued to Lucius P. Crandall for trace fasteners. We do not claim that construction but the construction herein disclosed.

Having thus described our invention, what we claim as new and useful and desire to secure by Letters-Patent is,

In a ferrule, a metal portion hollowed out for the reception of the end of a whiffletree, pole and the like, a solid hub portion of less diameter than the hollowed out portion, cast integral therewith and provided with a threaded end, the hub portion fitted loosely with a block, oval in cross-section and the threaded end with an oblong nut, said block having a lug on the end thereof adapted to glide in a curved slot in the wall of said metal portion at right angles with the hub portion and lying between the hollowed out portion and the hub.

In testimony whereof we affix our signatures in presence of two witnesses.

CLARK ROBINSON.
JASPER W. COUNSELMAN.

Witnesses:
V. B. McDowell,
C. J. Berkey.

Copies of this patent may be obtained for five cents each, by addressing the "Commissioner of Patents, Washington, D. C."